Aug. 20, 1963   N. V. CASSON   3,101,106

DEPTH STOP FOR SAW BLADES

Filed Jan. 15, 1962

INVENTOR:
NICHOLAS V. CASSON
BY
ATTORNEY

3,101,106
DEPTH STOP FOR SAW BLADES
Nicholas V. Casson, 175 Murray Ave., Yonkers 4, N.Y.
Filed Jan. 15, 1962, Ser. No. 166,093
1 Claim. (Cl. 145—35)

This invention relates in general to stops and, more particularly, to depth of cut stops for hack saw blades.

When an electrician cuts B-X or armored cable with a hack saw, it is hard for him to judge the depth of the cut as it is being made. If the cut is not made deep enough, the spiral convolutions of the armored cable will not separate, but, if the cut is made too deep, the soft insulation of the current carrying wires will be broken. If this break in the insulation of the wires is not noticed, dangerous short circuits may result in completed wiring which may be hard to locate and which may possibly cause a fire and even loss of life. It is, therefore, an object of this invention to provide a depth of cut stop for hack saw blades which will limit the depth of the cut into armored cables so that only the outer covering will be cut and the insulation around the current carrying wires will not be broken.

Another object of this invention is to provide a more easily attached and detached depth of cut stop for hack saw blades.

A further object of this invention is to provide a less costly and more easily fabricated depth of cut stop for hack saw blades.

A still further object of this invention is to provide a more securely attached depth of cut stop for hack saw blades which will not become accidentally dislodged from the blade.

Many other objects, advantages and features of invention will become apparent from the following description and accompanying drawing wherein.

Figure 1:
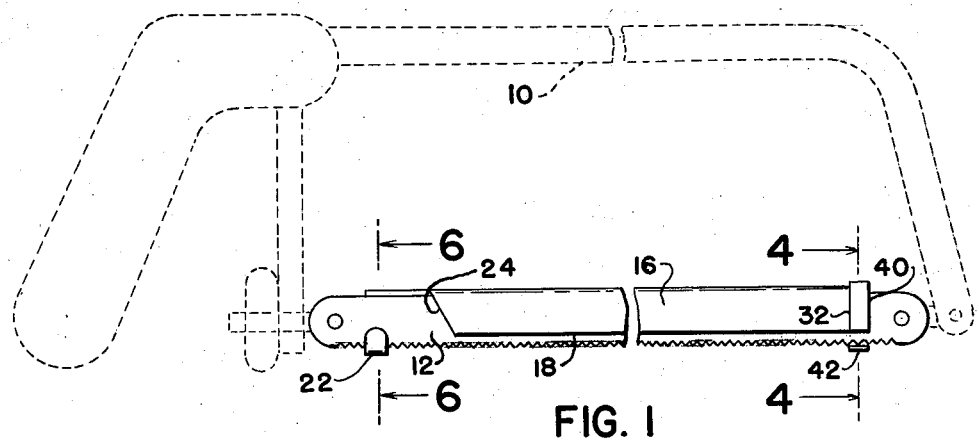
FIGURE 1 is a side view of a hack saw blade with my stop shown upon it and with the hack saw blade shown fixed within a hack saw frame which is drawn in dotted lines.
Figure 4:
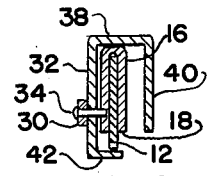
FIGURE 4 is a section taken on line 4—4 of FIGURE 1.
Figure 5:
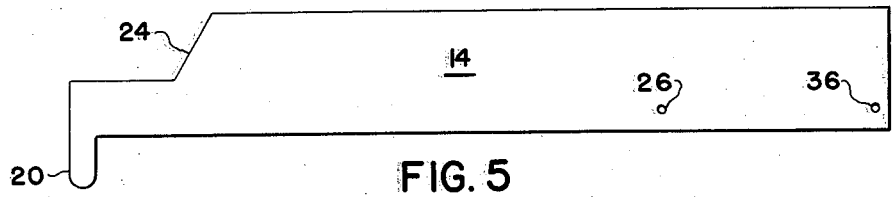
FIGURE 5 is a plan view of a blank from which my blade stop may be fabricated.

Referring to the drawings in detail, a hack saw frame 10 has a blade 12 fixed to it in the conventional manner. As shown in FIGURE 5, a blank 14 may be stamped from an appropriate piece of sheet metal. As shown in FIGURES 1 and 4, this blank is bent into a channel shaped member which forms the body 14 of the blade stop. A projection 20 of blank 14 is bent into the retaining hook 22 which extends downward from one end of the body 16 below a blade 12. A cutout portion 24 of the blank 14 leaves the cutout portion 24 on one side of the body 16 adjacent to the retaining hook 22.

Figure 2:
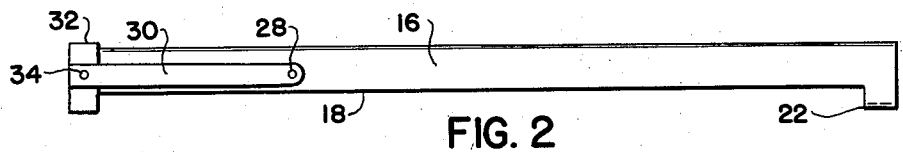
FIGURE 2 is a back view of my blade stop.

Referring now to FIGURES 2, 4 and 5, the end of body 16 disposed opposite the cutout 24 contains an aperture 26. By means of a rivet 28 or other suitable fastening device, a spring arm 30 is attached to extend along and flex toward the side of body 16. Fixed to the end of spring arm 30 is a blade lock 32 by means of a rivet 34 or other suitable fastening device. The rivet 34 may extend through the blade lock 32 to be slidably retained in an aperture 36. A top guide member 38 extends from lock 32 over the body 16 and then is bent downward to form the release button 40 which is disposed at some distance from body 16. A blade retainer 42 extends below one side of body 16 to project beneath blade 12.

Figure 3:
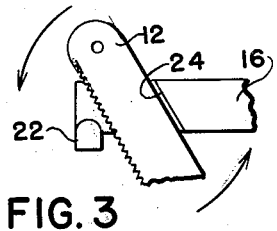
FIGURE 3 is a front view of a fragment of the blade stop being fixed about a blade.

My blade stop is locked about a blade in the following manner. The stop is placed at an angle to a blade 12 with the blade 12 lying in the cutout portion 24. The blade and the stop are then rotated relative to each other, as shown in FIGURE 3, with the body 16 sliding down about the blade 12. As the blade lock 32 moves downward towards the blade 12, the release button 40 is depressed by a finger to move a blade lock 32 away from the body 16 against the tension of spring arm 30. This withdraws the blade retainer 42 allowing the stop to seat over the blade as shown in FIGURES 1 and 4.

Figure 7:
FIGURE 7 is a transverse section through a piece of armored cable.

If an armored cable, such as that shown in FIGURE 7, is now cut with a blade 12 between the retaining hook 22 and the blade retainer 42, the lower edges 18 of the body 16 will only allow the blade to cut through the outer metal coils 44 of the armored cable. Inner paper windings 46 may be frayed but the insulation 48 about the wire 50 will not be able to be damaged.

Figure 6:
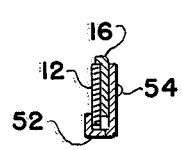
FIGURE 6 is a section taken on line 6—6 of FIGURE 1.

Referring to FIGURES 1 and 4, the retaining hooks 22 and the blade retainer 42 hold body 16 downward about blades 12 while it is cutting. Therefore, the blade retainer 42 may be urged downward relative to body 16 with great force. Thus the entry of rivet 34 into aperture 36 and the resting of top guide 38 on body 16 holds the blade retainer 42 a correct distance below the body 16 to retain the blade 12. If desired, the retaining hook 52 may be riveted to body 16 as shown in FIGURE 6 with a rivet 54.

Upon depressing the release button 40, the stop may be easily removed from blade 16 and the hack saw used for other purposes. Naturally, this stop has many other uses than the cutting of armored cable.

While I have described my invention in the best form known to me, modifications may be made without departing from the spirit of the invention except it may be more limited in the appended claim wherein I claim:

A depth of cut stop for hack saw blades comprising, in combination, (a) a channel shaped body having two sides which fit down on both sides of a hack saw blade, said body having one of said sides contain a cut-away portion at one end, (b) a blade retaining hook extending downwards from the end of said side of said body disposed across from the cut-away portion, (c) a spring arm fixed to the end portion of said body opposite said blade retaining hook, said spring arm being flexed towards said body, (d) a blade lock fixed to said spring arm and having a top guide member extending over said body and slidably contacting the top of said body, a release button portion at the end of said top guide member terminating beyond said body, and a blade retaining member extending beneath said body, the depression of said release button portion moving said blade retaining member outward beneath said body said body containing an aperture beneath said blade lock, and (e) fastening means extending through said spring arm and said blade lock entering said aperture in said body.

References Cited in the file of this patent

UNITED STATES PATENTS

| | | |
|---|---|---|
| 1,006,184 | De Padro | Oct. 17, 1911 |
| 2,085,999 | Radecki et al. | July 6, 1937 |
| 2,342,322 | Ailstock | Feb. 22, 1944 |